US011402925B2

(12) United States Patent
Hossain et al.

(10) Patent No.: US 11,402,925 B2
(45) Date of Patent: Aug. 2, 2022

(54) CROWN INPUT AND FEEDBACK FOR HEAD-MOUNTABLE DEVICES

(71) Applicant: Apple Inc., Cupertino, CA (US)

(72) Inventors: Muhammad F. Hossain, San José, CA (US); Erique Paul C. Apolinario, San José, CA (US); Prashanth Reddy Duvvuru Kamakshi, Cupertino, CA (US); Alex M. Lee, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/002,704

(22) Filed: Aug. 25, 2020

(65) Prior Publication Data

US 2021/0089136 A1     Mar. 25, 2021

Related U.S. Application Data

(60) Provisional application No. 62/906,012, filed on Sep. 25, 2019.

(51) Int. Cl.
*G02B 27/01*     (2006.01)
*G06F 3/01*      (2006.01)
*G06F 3/02*      (2006.01)

(52) U.S. Cl.
CPC ............ *G06F 3/0202* (2013.01); *G06F 3/011* (2013.01); *G06F 3/016* (2013.01)

(58) Field of Classification Search
None
See application file for complete search history.

(56) References Cited

U.S. PATENT DOCUMENTS

| | | | |
|---|---|---|---|
| 7,542,012 B2 | 6/2009 | Kato et al. | |
| 2013/0229339 A1* | 9/2013 | Takahata | G06F 3/016 345/156 |
| 2016/0033772 A1* | 2/2016 | Han | H04N 1/6083 359/630 |
| 2016/0058375 A1 | 3/2016 | Rothkopf | |
| 2016/0370590 A1 | 12/2016 | Fujishiro | |

(Continued)

FOREIGN PATENT DOCUMENTS

| | | |
|---|---|---|
| CN | 205721636 U | 11/2016 |
| CN | 107966895 A | 4/2018 |

(Continued)

OTHER PUBLICATIONS

International Search Report and Written Opinion from PCT/US2020/048124, dated Nov. 19, 2020, 15 pages.

(Continued)

*Primary Examiner* — Carl Adams
(74) *Attorney, Agent, or Firm* — BakerHostetler

(57) ABSTRACT

A head-mountable device can provide a crown module having an input system that allows a user to provide inputs by rotating or otherwise applying torque to a crown of the crown module. The head-mountable device can interpret the rotation and/or torque as a user input. The crown module can further include a feedback system that provides localized haptic feedback at the crown. The haptic feedback can be effectively perceived by the user at the crown without causing the entire head-mountable device to vibrate against the head and/or face of the user.

20 Claims, 5 Drawing Sheets

(56) References Cited

U.S. PATENT DOCUMENTS

2017/0090572 A1     3/2017  Holenarsipur et al.
2020/0033601 A1*    1/2020  Magrath ................. G06F 3/011

FOREIGN PATENT DOCUMENTS

CN        109100865 A    12/2018
JP        2015111416 A    6/2015

OTHER PUBLICATIONS

Chinese Evaluation Report from Chinese Patent Application No. 202021860181.2, dated Aug. 24, 2021, 18 pages including English language translation.

* cited by examiner

CROWN INPUT AND FEEDBACK FOR HEAD-MOUNTABLE DEVICES

CROSS-REFERENCE TO RELATED APPLICATION

This application claims the benefit of U.S. Provisional Application No. 62/906,012, entitled "CROWN INPUT AND FEEDBACK FOR HEAD-MOUNTABLE DEVICES," filed Sep. 25, 2019, the entirety of which is incorporated herein by reference.

TECHNICAL FIELD

The present description relates generally to head-mountable devices, and, more particularly, to crown modules for head-mountable devices.

BACKGROUND

A head-mountable device can be worn by a user to display visual information within the field of view of the user. The head-mountable device can be used as a virtual reality (VR) system, an augmented reality (AR) system, and/or a mixed reality (MR) system. A user may observe outputs provided by the head-mountable device, such as visual information provided on a display. The display can optionally allow a user to observe an environment outside of the head-mountable device. Other outputs provided by the head-mountable device can include speaker output and/or haptic feedback. A user may further interact with the head-mountable device by providing inputs for processing by one or more components of the head-mountable device. For example, the user can provide tactile inputs, voice commands, and other inputs while the device is mounted to the user's head.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Head-mountable devices, such as head-mountable displays, headsets, visors, smartglasses, head-up display, etc., can perform a range of functions that are managed by the components (e.g., sensors, circuitry, and other hardware) included with the wearable device. The head-mountable device can provide a user experience that is immersive or otherwise natural so the user can easily focus on enjoying the experience without being distracted by the mechanisms of the head-mountable device.

It can be desirable to provide a mechanism for a user to provide inputs to a head-mountable device to facilitate user interaction with the head-mountable device. It can be further desirable to provide a mechanism for providing feedback to the user. Such feedback can be provided in the form of haptic feedback delivered to the user. However, haptic feedback can feel unpleasant when applied across an entire device that is mounted on a head of the user. Where the user is providing tactile inputs by contacting an input member with another portion of the body, such as a finger or hand, the haptic feedback can be locally applied to that portion of the user's body, so that the haptic feedback is delivered in a way that is effective and pleasant to the user.

Systems of the present disclosure can provide a head-mountable device with a crown module with an input system that allows a user to provide inputs by rotating or otherwise applying torque to a crown of the crown module. The head-mountable device can interpret the rotation and/or torque as a user input. The crown module can further include a feedback system that provides localized haptic feedback at the crown. The haptic feedback can be effectively perceived by the user at the crown without causing the entire head-mountable device to vibrate against the head and/or face of the user.

These and other embodiments are discussed below with reference to FIGS. 1-8.

However, those skilled in the art will readily appreciate that the detailed description given herein with respect to these Figures is for explanatory purposes only and should not be construed as limiting.

Figure 1:
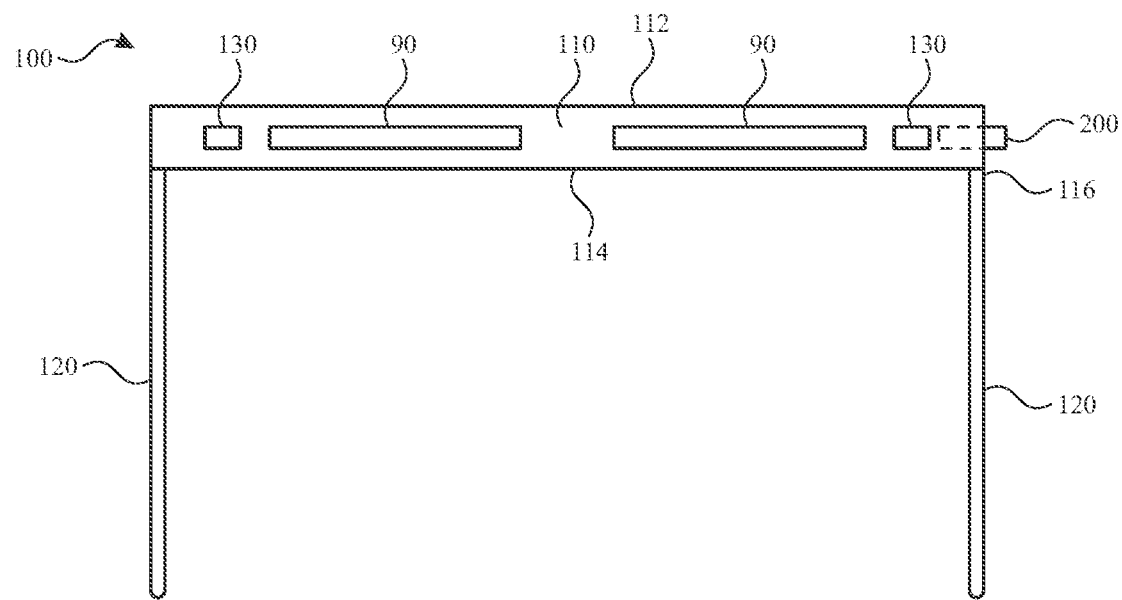
FIG. 1 illustrates a top view of a head-mountable device, according to some embodiments of the present disclosure.

According to some embodiments, for example as shown in FIG. 1, a head-mountable device 100 includes a frame 110 that is worn on a head of a user. The frame 110 can be positioned in front of the eyes of a user to provide information within a field of view of the user. The frame 110 can provide nose pads or another feature to rest on a user's nose. The frame 110 can be supported on a user's head with the securement element 120. The securement element 120 can wrap or extend along opposing sides of a user's head. The securement element 120 can include earpieces for wrapping around or otherwise engaging or resting on a user's ears. It will be appreciated that other configurations can be applied for securing the head-mountable device 100 to a user's head. For example, one or more bands, straps, belts, caps, hats, or other components can be used in addition to or in place of the illustrated components of the head-mountable device 100. By further example, the securement element 120 can include multiple components to engage a user's head.

The frame 110 can provide structure around a peripheral region thereof to support any internal components of the frame 110 in their assembled position. For example, the frame 110 can enclose and support various internal components (including for example integrated circuit chips, processors, memory devices and other circuitry) to provide computing and functional operations for the head-mountable device 100, as discussed further herein. Any number of components can be included within and/or on the frame 110 and/or the securement element 120.

The frame 110 can include and/or support one or more cameras 50. The cameras 50 can be positioned on or near an outer side 112 of the frame 110 to capture images of views external to the head-mountable device 100. As used herein, an outer side 112 of a portion of a head-mountable device is a side that faces away from the user and/or towards an external environment. The captured images can be used for display to the user or stored for any other purpose.

The head-mountable device can be provided with one or more display screens 90 that provide visual output for viewing by a user wearing the head-mountable device. As shown in FIG. 1, one or more optical modules containing display screens 90 can be positioned on an inner side 114 of the frame 110. As used herein, an inner side of a portion of a head-mountable device is a side that faces toward the user and/or away from the external environment. For example, a pair of optical modules can be provided, where each optical module is movably positioned to be within the field of view of each of a user's two eyes. Each optical module can be adjusted to align with a corresponding eye of the user. Movement of each of the optical modules can match movement of a corresponding camera 50. Accordingly, the optical module is able to accurately reproduce, simulate, or augment a view based on a view captured by the camera 50 with an alignment that corresponds to the view that the user would have naturally without the head-mountable device 100.

A display screen 90 can transmit light from a physical environment (e.g., as captured by a camera) for viewing by the user. Such a display screen can include optical properties, such as lenses for vision correction based on incoming light from the physical environment. Additionally or alternatively, a display screen 90 can provide information as a display within a field of view of the user. Such information can be provided to the exclusion of a view of a physical environment or in addition to (e.g., overlaid with) a physical environment.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment.

In some situations, (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head-mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mountable system may have one or more speaker(s) and an integrated opaque display. Alternatively, a head-mountable system may be configured to accept an external opaque display (e.g., a smartphone). The head-mountable system may incorporate one or more imaging sensors to capture images or video of the physical environment, and/or one or more microphones to capture audio of the physical environment. Rather than an opaque display, a head-mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

As further shown in FIG. 1, the head-mountable device 100 can include a crown module 200 that received input from a user and provides feedback to the user. The crown module 200 can be provided on exterior surface of the head-mountable device 100, such as on the frame 110. As shown in FIG. 1, the crown module 200 can be provided on a lateral side 116 that is defined by and outwardly facing surface between the outer side 112 and the inner side 114 of the frame 110. It will be understood that the crown module 200 can be provided at any portion of the head-mountable device 100, including any portion of the frame 110 (e.g., outer side 112 or inner side 114) and/or on the securement element 120. It will be further understood that multiple crown modules 200 can be provided by the head-mountable device 100. For example, separate crown modules 200 can be provided on a same side or opposing sides of the head-mountable device 100.

Figure 2:
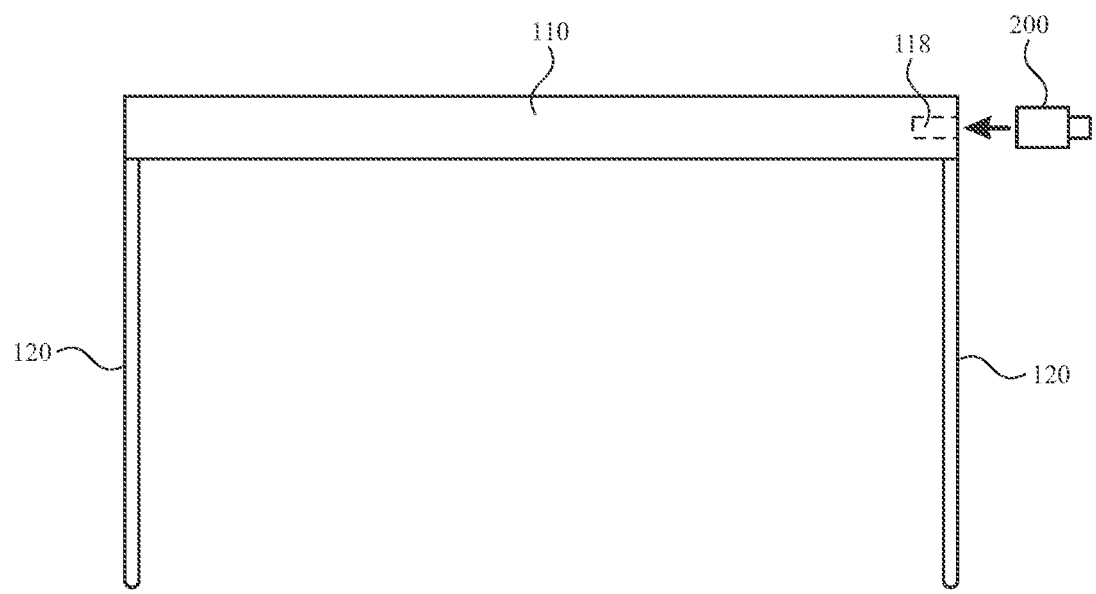
FIG. 2 illustrates a top exploded view of a head-mountable device, according to some embodiments of the present disclosure.

Referring now to FIG. 2, the crown module 200 can be provided as a self-contained component that is connected both to other portions of the head-mountable device 100. For example, the frame 110 or another portion of the head-mountable device 100 can provide a recess 118 into which the crown module 200 can be inserted. By providing the crown module 200 as a self-contained component, the crown module 200 can be sealed so that its internal components are protected from an external environment.

The crown module 200 can include one or more attachment elements configured to facilitate mechanical coupling or connection of the crown module 200 and the frame 110 by engaging complementary attachment elements of the frame 110 (e.g., within the recess 118). The attachment elements can include protrusions, grooves, locks, latches, snaps, screws, clasps, threads, magnets, and/or pins can be included on the crown module 200 and/or the frame 110 for securely attaching the crown module 200 to the frame 110.

The crown module 200 and the frame 110 can each include one or more communication interfaces that facilitate a communication link between the crown module 200 and the frame 110 (e.g., a controller within the frame 110). The communication interfaces can include one or more of a variety of features, such as electrical connectors, pogo pins, conductive surfaces, wireless receivers/transmitters, and/or inductive coupling features (e.g., coils) for communicably coupling the components of the frame 110 and the crown module 200.

Figure 3:
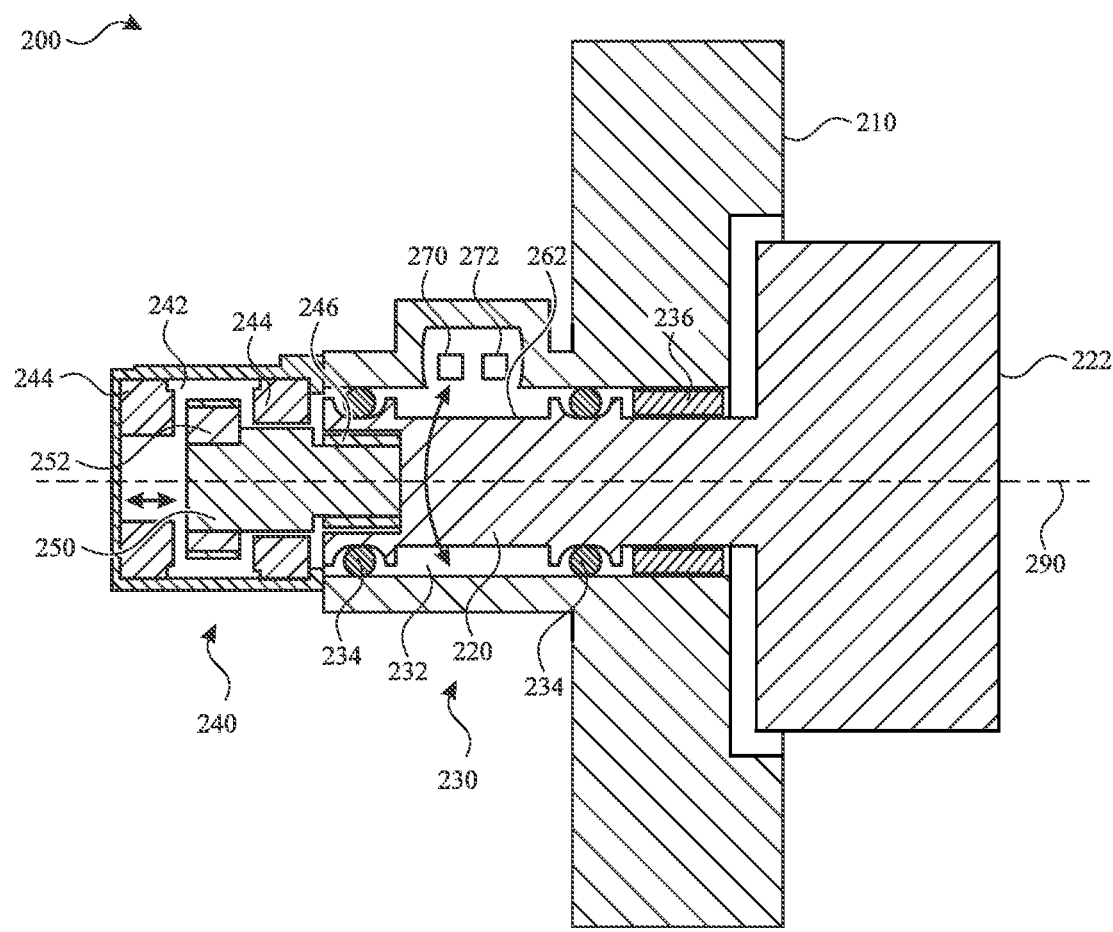
FIG. 3 illustrates a sectional view of a crown module of the head-mountable device of FIG. 2, according to some embodiments of the present disclosure.

Referring now to FIG. 3, the crown module 200 can provide an input system 230 that facilitates receiving input by a user and a feedback system 240 that provides feedback to the user. For the purposes of the following description, the described crown module 200 is one example of that shown and discussed above with respect to FIGS. 1 and 2. However, certain features of the crown module 200, including the external surface geometry, may be simplified or vary with respect to aspects of the crown module 200 discussed above.

As shown in FIG. 3, the crown module 200 can include a housing 210 that defines at least a portion of an outer periphery of the crown module 200 and contains internal components thereof. A crown 222 can be provided at an exterior portion of the housing 210. For example, the crown 222 can protrude from a surface of the housing 210 to be accessible by user. The crown 222 can be connected to a shaft 220 that extends within the housing 210. The crown 222 and/or the shaft 220 can be supported relative to the housing 210 by one or more bearings 236 that facilitates rotation and/or translation of the crown 222 and/or the shaft 220 relative to the housing 210.

The housing 210 can define a first chamber 232 that is sealed from an external environment. Components of the input system 230 can be positioned within the first chamber 232. As such, the components of the input system 230 can be protected from ingress of fluids and/or particles that would interfere with operation of the input system 230. The first chamber 232 can be defined at least in part by one or more seal members (e.g., O-rings) that move with the shaft 220 within the first chamber 232 of the housing 210.

The housing 210 can define a second chamber 242 that is also sealed from an external environment. Components of the feedback system 240 can be positioned within the second chamber 242. As such, the components of the feedback system 240 can be protected from ingress of fluids and/or particles that would interfere with operation of the feedback system 240. At least one component (e.g., connector 250) of the feedback system 240 (e.g., in the second chamber 242) can be connected to the shaft 220 or another component of the input system 230 (e.g., in the first chamber 232). The second chamber 242 and the first chamber 232 can optionally be connected to form a single continuous chamber.

The crown 222 and/or the shaft 220 can be supported by one or more bearings 236 that facilitates rotation and/or translation of the crown 222 and/or the shaft 220 relative to the housing 210. The connector 250 can be supported by one or more bearings 246 that facilitates translation of the connector 250 with the crown 222 and/or the shaft 220. The bearings 246 can optionally allow rotation of the connector 250 relative to the crown 222 and/or the shaft 220 while coupling the connector 250 to the shaft 220 for translation in unison.

In some embodiments, the crown 222 may be used to accept rotary input from the user, which may be used to control aspects of the head-mountable device. The crown 222 may be knurled or otherwise textured to improve grip with the user's finger and/or thumb. In some embodiments, a crown 222 may be turned by the user to scroll a display or select from a range of values. In other embodiments, the crown 222 may be rotated to move a cursor or other type of selection mechanism from a first displayed location to a second displayed location in order to select an icon or move the selection mechanism between various icons that are output on the display. The crown may also be used to control the volume of a speaker, the brightness of the display screen, visual output of the head-mountable device, or control other hardware settings.

In some embodiments, an optical encoder may be used to detect the rotational motion of the crown about an axis. More specifically, the example provided below with respect to FIG. 3 may use an optical encoder to detect rotational movement, rotational direction and/or rotational speed of a component of the electronic device. Once the rotational movement, rotational direction and/or rotational speed have been determined, this information may be used to output or change information and images that are presented on a display or user interface of the head-mountable device.

As shown in the example embodiment of FIG. 3, the optical encoder of the present disclosure includes a light source 270, an optical sensor 272 (e.g., photodiode and/or photodiode array), and a shaft 220. In some embodiments, the optical encoder of the present disclosure can utilize an encoding pattern 262 disposed directly on the shaft 220. For example, the encoding pattern 262 can include a number of light and dark markings or stripes that are axially disposed along the shaft 220. Each stripe or combination of stripes on the shaft 220 may be used to identify a position of the shaft 220. For example, as light is emitted from the light source 270 and reflected off of the shaft 220 into the optical sensor 272, a position, rotation, rotation direction and rotation speed of the shaft 220 may be determined. Once the rotation direction and speed are determined, this information may be used to output or change information or images that are presented on the display or user interface of the head-mountable device.

In other embodiments, the shape or form of the shaft 220 of the encoder may be used to determine a position, rotation, rotation direction and rotation speed of the shaft 220. For example, the shaft 220 may be fluted or have a number of channels that cause the light to be reflected in a number of different directions. Accordingly, a diffractive pattern may be used to determine the rotation, rotation direction and rotation speed of the shaft 220.

As shown in FIG. 3, a crown assembly may be provided partially within the housing 210 of the crown module 200 and may be formed from a crown 222 disposed at the end of a shaft 220. As discussed above, the crown module 200 includes an optical encoder that includes a shaft 220, a light source 270, and an optical sensor 272. Although an optical sensor is specifically mentioned, embodiments disclosed herein may use various types of sensors that are arranged in various configurations for detecting the movement described herein. For example, the movement of the shaft 220 may be detected by an image sensor, a light sensor such as a CMOS light sensor or imager, a photovoltaic cell or system, photo resistive component, a laser scanner and the like.

The optical encoder may produce an encoder output that is used to determine positional data of the crown 222. In particular, the optical encoder may produce an output that is used to detect that movement of the crown 222 including the direction of the movement, speed of the movement and so on. The movement may be rotational movement (e.g., about the axis 290), translational movement (e.g., along or parallel to the axis 290), angular movement (e.g., tilt relative to the axis 290), and so on. The optical encoder may also be used to detect the degree of the change of rotation of the crown 222 and/or the angle of rotation of the crown 222 as well as the speed and the direction of the rotation of the crown 222.

The crown 222 can be coupled to and/or monolithically formed with the shaft 220. In some cases, the shaft 220 and crown 222 may be formed as a single piece. As the shaft 220 is coupled to, or is otherwise a part of the crown 222, as the crown 222 rotates or moves in a particular direction and at a particular speed, the shaft 220 also rotates or moves in the same direction and with the same speed.

As further shown in FIG. 3, the feedback system 240 can include mechanisms that facilitate haptic feedback. A feedback system can be implemented as any suitable device configured to provide force feedback, vibratory feedback, tactile sensations, and the like. For example, in one embodiment, the feedback system may be implemented as a linear actuator configured to provide a punctuated haptic feedback, such as a tap or a knock.

According to some embodiments, the feedback system 240 can include a magnetic element 252. The magnetic element 252 can be coupled to the shaft 220 (e.g., via a connector 250) such that the magnetic element 252 moves along the axis 290 relative to the housing 210 along with the shaft 220. For example, the magnetic element 252 can be directly or indirectly (e.g., via the connector 250 and/or the intermediate bearing 246) connected to the shaft 220.

The magnetic element 252 can include a temporary magnet of a soft magnetic material or a permanent magnet of a hard magnetic material. As used herein, "magnet" can include a magnet of a hard magnetic material and/or a magnet of a soft magnetic material. Hard magnetic materials include materials that retain their magnetism even after the removal of an applied magnetic field. Magnets that include hard magnetic material can form permanent magnets. Hard magnetic materials include neodymium (NdFeB), iron-neodymium, iron-boron, cobalt-samarium, iron-chromium-cobalt, and combinations or alloys thereof. Soft magnetic materials include materials that are responsive to magnetic fields, but do not retain their magnetism after removal of an applied magnetic field. Magnets that include soft magnetic material can form temporary magnets. Soft magnetic materials include iron, iron-cobalt, iron-silicon, steel, stainless steel, iron-aluminum-silicon, nickel-iron, ferrites, and combinations or alloys thereof. It will be recognized that "hard magnetic" and "soft magnetic" does not necessarily relate to the rigidity of the materials.

The feedback system 240 can further include a magnetic field generator to induce a magnetic field in the magnetic element 252. For example, one or more coils 244 can be positioned on one or more sides of the magnetic element 252. The coils 244 can include one or more helical windings in one or more layers. It will be recognized that any number of windings and arrangements of the coil can be provided to induce a magnetic field.

It will be recognized that various arrangements and alterations to the above description can be implemented to provide haptic feedback. For example, the magnetic element 252 can be exchanged with the coils 244 such that the magnetic element 252 is moveable with the housing 210 and the coils 244 are moveable with the shaft 220. The magnetic element 252 can have a variety of shapes and sizes. Multiple magnetic elements can be provided. These and other designs can be implemented to facilitate an induced magnetic field and magnetic forces between the magnetic elements.

As shown in FIG. 3, the coils 244 are operated to induce a magnetic field near the magnetic element 252. When the coils 244 are activated with an electric current, the causes the magnetic element 252 to move under the influence of a magnetic force. For example, where the magnetic element 252 is a temporary magnet of a soft magnetic material, the magnetic field can cause the magnetic domains of the magnetic element 252 to align with the magnetic field. The magnetic element 252 will then be attracted toward a direction based on the activated coils 244. Additionally or alternatively, the magnetic element 252 can be a permanent magnet of a hard magnetic material. Based on the alignment (i.e., polarity) of such a permanent magnet, the magnetic field causes the magnetic element 252 to attract toward or repel away from one or more coils 244 when activated.

As the magnetic element 252 moves (e.g., along the axis 290), the shaft 220 moves relative to the housing 210 (e.g., along the axis 290). As described above, the magnetic element 252 is connected to the shaft 220 to move with the shaft 220 and the coils 244 are connected to the housing 210 to move with the housing 210. As such, magnetic forces between the magnetic element 252 and the coils 244 are transmitted to the shaft 220 and the housing 210 to cause relative movement there between.

The haptic feedback can include movement of the shaft 220 relative to the housing and along the axis 290 of the crown module 200. For example, the magnetic element 252 can be aligned along the axis 290 of the crown module 200. Movement from haptic feedback can be along the same axis 290 about which the crown 222 and the shaft 220 rotate. Additionally or alternatively, movement from haptic feedback can be along another axis or in multiple axes and directions.

In use, the coils 244 can be operated to provide haptic feedback while the user is operating (e.g., contacting and/or rotating) the crown 222. The haptic feedback can be provided based on a variety of conditions and parameters. For example, the haptic feedback can be controlled by providing an electric current to the coils 244. The induced and corresponding magnetic force between the magnetic element 252 and the coils 244 is based on the current in the coils 244. As such, the current can have a duration, amplitude, frequency, waveform, duty cycle, or other parameters as desired for a desired and corresponding haptic feedback.

For example, the shaft 220 can be made to vibrate by applying a control signal to the coils 244. The control signal may be a wave having a predetermined amplitude and/or frequency. When the control signal is applied, the induced magnetic field causes the shaft 220 to vibrate at the frequency of the control signal. The frequency can be in a range between 10 Hz and 5,000 Hz, 50 Hz and 1,000 Hz, or 100 Hz and 500 Hz. The frequency of the control signal may be adjusted to alter the rate of movement of the shaft 220 if a certain vibration is desired. The amplitude of the control signal may be correlated to the magnitude of movement of the shaft 220, and may be adjusted to alter the intensity of the vibration.

The feedback system 240 can provide haptic feedback to a user by moving the shaft 220 of the crown module 200 relative to the housing 210. In contrast to haptic feedback applied directly to the housing 210 and/or other portions of the head-mountable device, haptic feedback provided at the shaft 220 more directly provides sensations relating to the shaft 220. For example, haptic feedback can be provided while the user is operating (e.g., contacting and/or rotating) the crown 222. As the shaft 220 and the crown 222 are moved (e.g., vibrated) relative to the housing 210, the rest of the head-mountable device can remain stationary, so that the haptic feedback is not felt by the user at other locations of contact. By further example, while the user is wearing the head-mountable device, the haptic feedback can nonetheless be localized to the crown 222 so that the user feels the haptic feedback only at that location.

The feedback system 240 can provide haptic feedback based on operation of the crown module 200. For example, haptic feedback can be provided while the crown 222 and/or the shaft 220 are rotated by the user. Incremental and/or periodic haptic feedback can be provided based on the rotation performed by the user. By further example, the haptic feedback can be provided at a speed that corresponds to the speed of rotation performed by the user. As such, the haptic feedback can provide confirmation to the user relating to the input that is received by the user.

The feedback system 240 can provide haptic feedback based on activities performed by the head-mountable device. For example, the haptic feedback can correspond to visual information that is output to the user by the head-mountable device. By further example, visual information can be modified by use or operation of the crown, and haptic feedback can be provided to indicate how the user can interact with the visual information. For example, the user can rotate the crown in one or both of two directions to cause the head-mountable device to perform certain actions. Such rotation be performed to control the volume of a speaker, the brightness of the display screen, visual output of the head-mountable device, optical settings of an optical subassembly, or control other hardware settings. Rotation can be performed to scroll through a list or other set of items visually displayed by the head-mountable device.

While a first type of haptic feedback can be provided as the user rotates the crown, a second type of haptic feedback can be provided to indicate how the user can interact with the head-mountable device and/or limitations regarding the user input. For example, as the user scrolls through a list displayed by the head-mountable device, a first type of haptic feedback can be provided based on the user input (e.g., speed of rotation, etc.). By further example, as the user reaches the end of a list, a second type of haptic feedback can be provided to indicate that the user has reached the end of the list. Additionally or alternatively, different types of feedback can be provided in this way for other actions, such as zooming in on or out from an image, changing volume settings, changing display brightness, and the like.

The feedback system 240 can provide haptic feedback for one or more other purposes. According to some embodiments, the haptic feedback can notify the user based on a message, alert, or alarm. Such notifications can be accompanied by other feedback, including tactile, auditory, and/or visual feedback on the crown module 200 and/or the external device. According to some embodiments, the haptic feedback can provide confirmation that a user selection (e.g., made with the crown module 200) has been received by the head-mountable device and/or an external device. According to some embodiments, the haptic feedback can inform the user regarding status or operation of the head-mountable device and/or an external device.

Referring now to FIGS. 4-7, a crown module 300 can be provided for receiving input from a user and providing feedback to the user. The crown module 300 can be provided with the head-mountable device as an alternative to and/or in addition to the crown module 200. For example, the crown module 300 can be a self-contained module that is assembled with other components of the head-mountable device as described herein with respect to the crown module 200.

Figure 4:
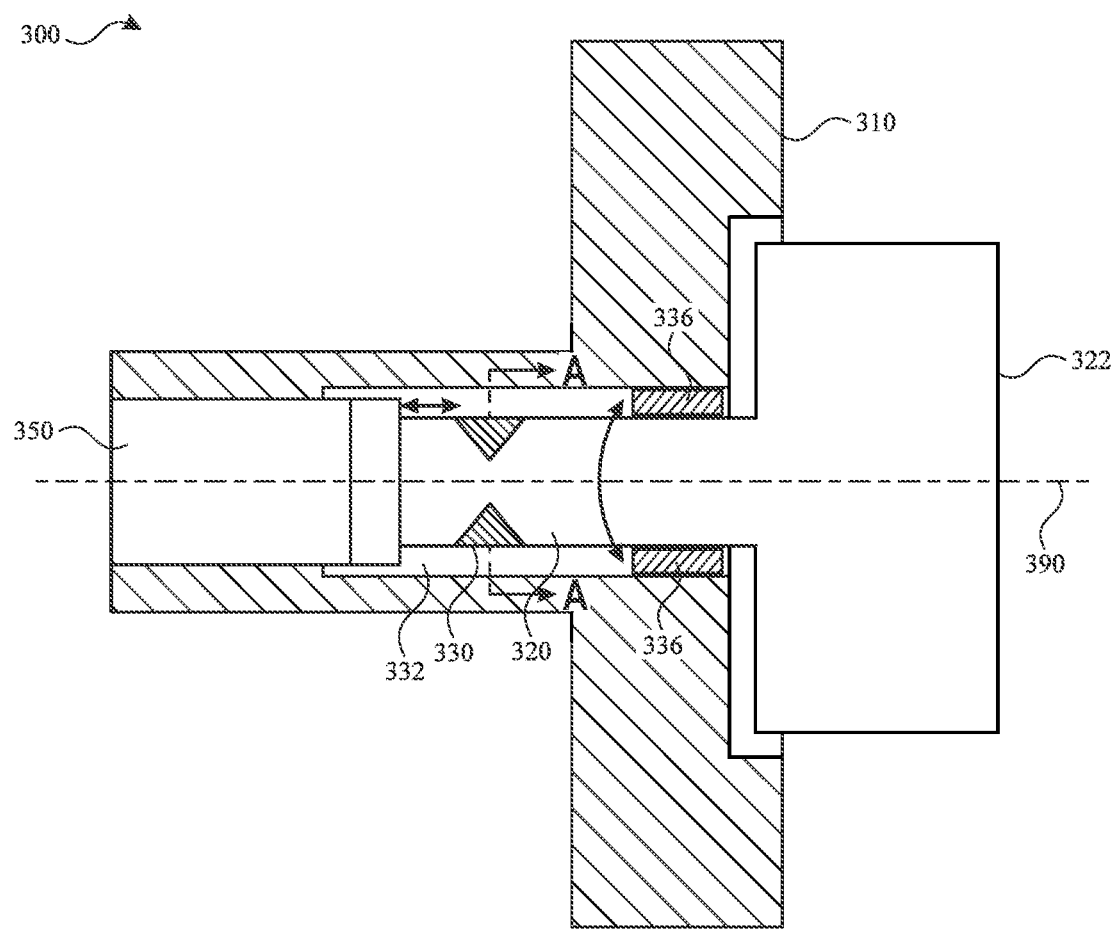
FIG. 4 illustrates a partial sectional view of a crown module of the head-mountable device of FIG. 2, according to some embodiments of the present disclosure.

As shown in FIG. 4, the crown module 300 can include a housing 310 that defines at least a portion of an outer periphery of the crown module 300 and contains internal components thereof. A crown 322 can be provided at an exterior portion of the housing 310. For example, the crown 322 can protrude from a surface of the housing 310 to be accessible by user. The crown 322 can be connected to a shaft 320 that extends within the housing 310. The crown 322 and/or the shaft 320 can be supported relative to the housing 310 by one or more bearings 336.

The housing 310 can define a chamber 332 that is sealed from an external environment. As such, the components of the crown module 300 can be protected from ingress of fluids and/or particles that would interfere with operation thereof.

The crown module 300 can include a torque sensor 330 configured to detect torque that is applied by a user to the crown 322 and transferred to the shaft 320. For example, the user can apply a torque to the crown 322 by urging the crown 322 to rotate about the axis 390. It will be understood that such a torque may not result in significant rotation about the axis 390. For example, the crown 322 and/or the shaft 320 can be coupled to the housing 310 such that no significant rotation is achieved. Despite this coupling, a torque can be applied to the crown 322 and transferred to the shaft 320. As the shaft 320 is subjected to such a torque, the torque sensor 330 can detect the torque and interpret the torque as an input from the user. Mechanisms for detecting torque are described further herein.

In some embodiments, the crown 322 may be used to accept torque input from the user, which may be used to control aspects of the head-mountable device. The crown 322 may be knurled or otherwise textured to improve grip with the user's finger and/or thumb. In some embodiments, the crown 322 may be operated to provide inputs such as those described with respect to the crown module 200. For example, the crown 322 may be torqued by the user to scroll a display or select from a range of values. In other embodiments, the crown 322 may be torqued to move a cursor or other type of selection mechanism from a first displayed location to a second displayed location in order to select an icon or move the selection mechanism between various icons that are output on the display. The crown may also be used to control the volume of a speaker, the brightness of the display screen, visual output of the head-mountable device, or control other hardware settings.

As further shown in FIG. 4, the crown module 300 can be provided with a feedback system 350 that includes mechanisms that facilitate haptic feedback. According to some embodiments, the feedback system 350 can be the same or similar to the feedback system 240 of the crown module 200. For example, the feedback system 350 can be coupled to the shaft 320 such that a component of the feedback system 350 moves along the axis 390 relative to the housing 310 along with the shaft 320. Additionally or alternatively, the feedback system 350 can include or be connected to motors, hydraulic actuators, pneumatic actuators, magnetic actuators, piezoelectric actuators, electroactive materials (e.g., polymers), stepper motors, shape-memory alloys, and/or the like for providing mechanical movement as haptic feedback.

Figure 5:
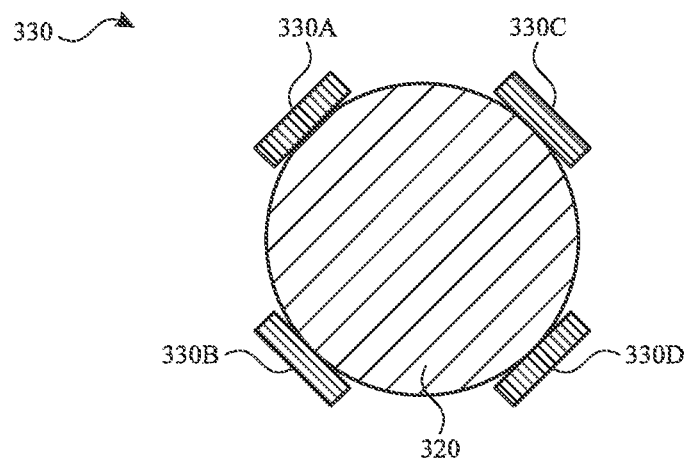
FIG. 5 illustrates a sectional view of the crown module of FIG. 4 taken along line A-A, according to some embodiments of the present disclosure.
Figure 6:
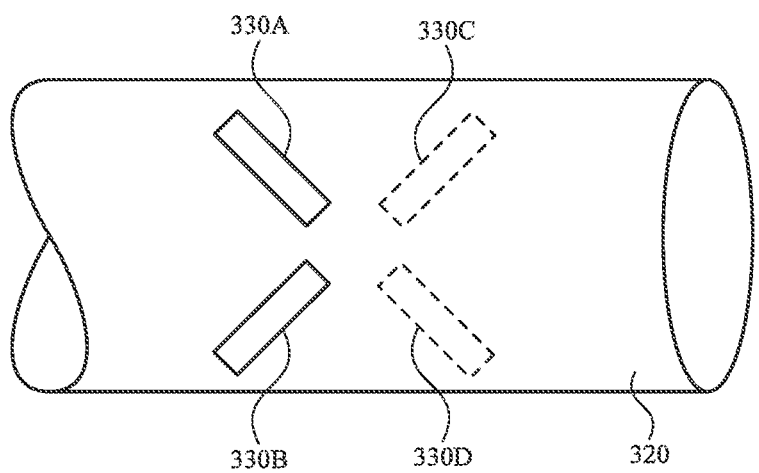
FIG. 6 illustrates a side view of the crown module of FIG. 4, according to some embodiments of the present disclosure.

As shown in FIGS. 5 and 6, the torque sensor 330 can include multiple strain gauges 330A, 330B, 330C, and 330D. The strain gauges of the torque sensor 330 can operate as a resistive sensor formed from a material that exhibits a change in electrical resistance (e.g., conductance) in response to a dimensional change such as compression, tension, or force. The strain gauges can each be a compliant material that exhibits at least one electrical property that is variable in response to deformation, deflection, or shearing of the electrode. The strain gauges may be formed from a piezoelectric, piezoresistive, resistive, or other strain-sensitive materials.

As further shown in FIGS. 5 and 6, the strain gauges 330A, 330B, 330C, and 330D can be distributed at different locations on the shaft 320. For example, as shown in FIG. 5, some of the strain gauges can be placed on a first radial side of the shaft 320, and other strain gauges can be placed on a second radial side of the shaft 320. By further example, as shown in FIG. 6, some of the strain gauges can be placed in a first orientation relative to an axis of the shaft 320, and other strain gauges can be placed in a second orientation relative to the axis of the shaft 320. In such different orientations, an applied torque will cause some of the strain gauges to be placed in compression whereas another strain gauge is placed into tension (e.g., tensile strain) in response to the torque.

Figure 7:
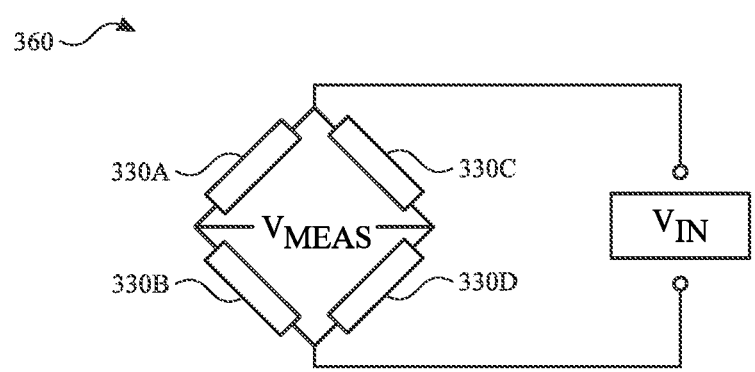
FIG. 7 illustrates a circuit diagram of a sensor of the crown module of FIG. 4, according to some embodiments of the present disclosure.

As shown in FIG. 7, the strain gauges 330A, 330B, 330C, and 330D can be coupled to each other in an electrical circuit 360. The electrical circuit can be configured to monitor one or more electrical properties (e.g., resistance, capacitance, accumulated charge, inductance, and so on) of the strain gauges for changes. The electrical circuit 360 then quantifies these changes, which may be used to estimate the applied torque. For example, the electrical circuit 360 can include a Wheatstone bridge arrangement to measure an electrical resistance by balancing two legs of a bridge circuit with opposing pairs of strain gauges. An applied voltage can be compared to a measured voltage within the Wheatstone bridge of the electrical circuit 360 to determine a combined effect of torque on the multiple strain gauges 330A, 330B, 330C, and 330D.

The multiple strain gauges 330A, 330B, 330C, and 330D can be connected to approximate a magnitude of torsional strain (e.g., torque) experienced by the shaft 320. In some embodiments, a magnitude of strain can be obtained by measuring a common property (e.g., parallel and/or series resistance) and/or a differential property (e.g., voltage division) of the multiple strain gauges. For example, differential property estimates can be combined with or compared to common property estimates. By further example, the differential property estimate and common property estimate can be combined by unweighted or weighted averaging. In some embodiments, the maximum or minimum of the two estimates can be used. In some embodiments, other methods of combining or deciding between the two estimates can be used.

Once the resistance of each strain gauge is obtained via calculation or measurement, each can be compared to a known baseline resistance value in order to determine whether the strain gauges are experiencing tension or compression. In other words, when the force-sensitive structure experiences a reaction force, it may deform, causing one or more strain gauges to either expand (e.g., tension) or contract (e.g., compression), which can cause the resistance thereof to change in a mathematically predictable manner. In some cases, the resistance or other electrical property of a strain gauge is measured as a relative value, which may factor environmental effects, such as temperature and/or residual or static strain.

For certain materials, resistance can change linearly with compression or tension. For other materials, resistance can change following a known curve in response to compression or tension. Accordingly, depending upon the material selected for the strain gauges, and the position of the strain gauges on the shaft 320, a particular resistance and/or measured voltage can be correlated to a particular amount of strain experienced by a particular strain gauge, which in turn can itself be correlated to an amount of force applied to the force-sensitive structure, which in turn can be correlated to an amount of torque applied to the crown.

Figure 8:
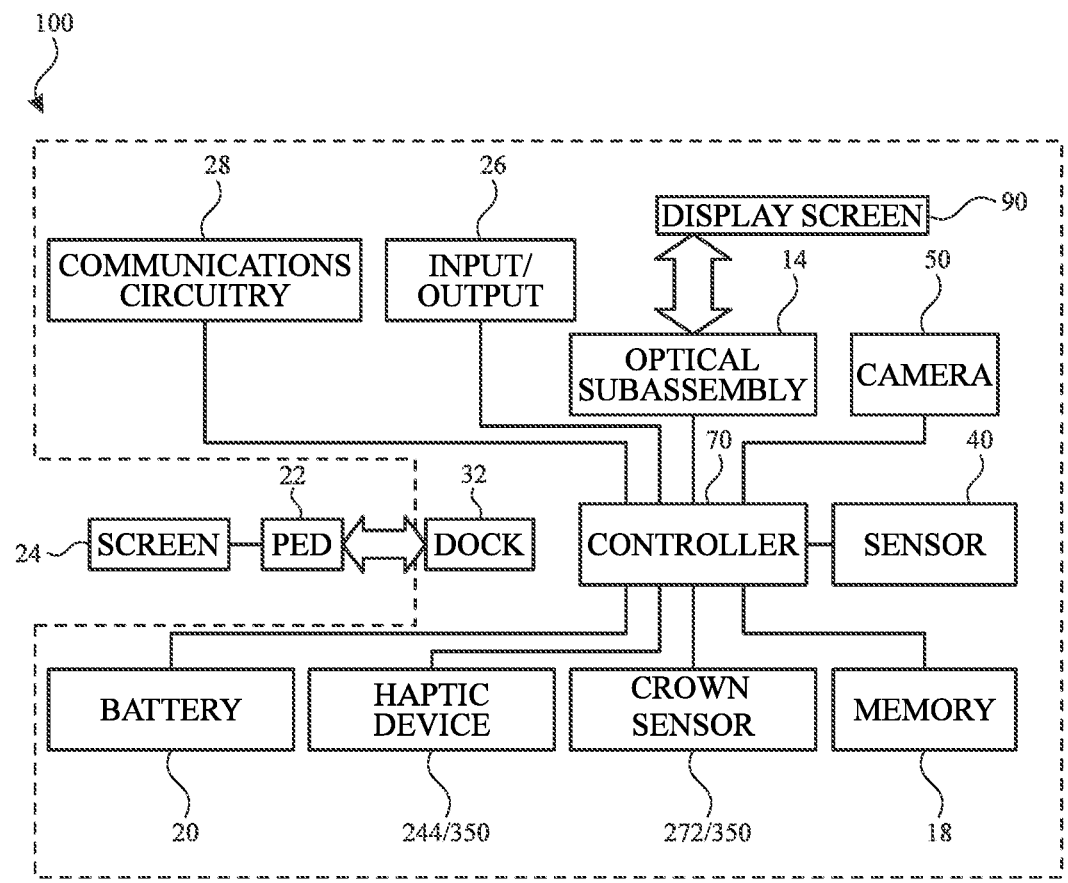
FIG. 8 illustrates a block diagram of a head-mountable device, in accordance with some embodiments of the present disclosure.

Referring now to FIG. 8, components of the head-mountable device can be operably connected to provide the performance described herein. FIG. 8 shows a simplified block diagram of an illustrative head-mountable device 100 in accordance with one embodiment of the invention. It will be appreciated that components described herein can be provided on either or both of a frame and/or a securement element of the head-mountable device 100.

As shown in FIG. 8, the head-mountable device 100 can include a controller 70 with one or more processing units that include or are configured to access a memory 18 having instructions stored thereon. The instructions or computer programs may be configured to perform one or more of the operations or functions described with respect to the head-mountable device 100. The controller 70 can be implemented as any electronic device capable of processing, receiving, or transmitting data or instructions. For example, the controller 70 may include one or more of: a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitably configured computing element or elements.

The memory 18 can store electronic data that can be used by the head-mountable device 100. For example, the memory 18 can store electrical data or content such as, for example, audio and video files, documents and applications, device settings and user preferences, timing and control signals or data for the various modules, data structures or databases, and so on. The memory 18 can be configured as any type of memory. By way of example only, the memory 18 can be implemented as random access memory, read-only memory, Flash memory, removable memory, or other types of storage elements, or combinations of such devices.

The head-mountable device 100 can include the camera 50 for capturing a view of an environment external to the head-mountable device 100. The camera 50 can include an optical sensor, such as a photodiode or a photodiode array. Additionally or alternatively, the camera 50 can include one or more of various types of optical sensors that are arranged in various configurations for detecting user inputs described herein. The camera 50 may be configured to capture an image of a scene or subject located within a field of view of the camera 50. The image may be stored in a digital file in accordance with any one of a number of digital formats. In some embodiments, the head-mountable device 100 includes a camera, which includes an image sensor formed from a charge-coupled device (CCD) and/or a complementary metal-oxide-semiconductor (CMOS) device, a photovoltaic cell, a photo resistive component, a laser scanner, and the like. It will be recognized that a camera can include other motion sensing devices.

The head-mountable device 100 can include a battery 20, which can charge and/or power components of the head-mountable device 100.

The head-mountable device 100 can include one or more other input/output components 26, which can include any suitable component for connecting head-mountable device 100 to other devices. Suitable components can include, for example, audio/video jacks, data connectors, and/or any additional or alternative input/output components. The input/output components 26 can include a microphone. The microphone can be operably connected to the controller 70 for receiving audio input, including voice commands from the user. The input/output components 26 can include one or more speakers. The speakers can be operably connected to the controller 70 for control of speaker output, including sound levels.

The head-mountable device 100 can include communications circuitry 28 for communicating with one or more servers or other devices using any suitable communications protocol. For example, the communications circuitry 28 can support Wi-Fi (e.g., a 802.11 protocol), Ethernet, Bluetooth, high frequency systems (e.g., 900 MHz, 2.4 GHz, and 5.6 GHz communication systems), infrared, TCP/IP (e.g., any of the protocols used in each of the TCP/IP layers), HTTP, BitTorrent, FTP, RTP, RTSP, SSH, any other communications protocol, or any combination thereof. The communications circuitry 28 can also include an antenna for transmitting and receiving electromagnetic signals.

The head-mountable device 100 can further include an optical module for displaying visual information for a user, including the display screen 90 and/or an optical subassembly 14. The head-mountable device 100 can include an optical subassembly 14 configured to help optically adjust and correctly project the image based content being displayed by the display 190 for close up viewing. The optical subassembly 14 can include one or more lenses, mirrors, or other optical devices.

The head-mountable device 100 can optionally connect to a portable electronic device 22, which can provide certain functions. The portable electronic device 22 can provide a handheld form factor (e.g., small portable electronic device which is light weight, fits in a pocket, etc.). Although not limited to these, examples include media players, phones (including smart phones), PDAs, watches, computers, and the like. The portable electronic device may include a screen for presenting the graphical portion of the media to the user. The portable electronic device can provide processing capabilities by communicating with the controller 70 of the head-mountable device 100. The portable electronic device can provide actuation to dislodge particles from components of the head-mountable device 100 by operating a haptic feedback element of the portable electronic device.

The head-mountable device 100 can include a dock 32 operative to receive the portable electronic device 22. The dock 32 can include a connector (e.g., Lightning, USB, FireWire, power, DVI, etc.), which can be plugged into a complementary connector of the portable electronic device 22. The dock 32 may include features for helping to align the connectors during engagement and for physically coupling the portable electronic device 22 to the head-mountable device 100. For example, the dock 32 may define a cavity for placement of the portable electronic device 22. The dock 32 may also include retaining features for securing portable electronic device 22 within the cavity. The connector on the dock 32 can function as a communication interface between the portable electronic device 22 and the head-mountable device 100.

The head-mountable device 100 can include one or more other sensors 40. Such sensors can be configured to sense substantially any type of characteristic such as, but not limited to, images, pressure, light, touch, force, temperature, position, motion, and so on. For example, the sensor can be a photodetector, a temperature sensor, a light or optical sensor, an atmospheric pressure sensor, a humidity sensor, a magnet, a gyroscope, an accelerometer, a chemical sensor, an ozone sensor, a particulate count sensor, and so on. By further example, the sensor can be a bio-sensor for tracking biometric characteristics, such as health and activity metrics. Other user sensors can perform facial feature detection, facial movement detection, facial recognition, eye tracking, user mood detection, user emotion detection, voice detection, etc.

The head-mountable device 100 can include one or more sensors (e.g., eye sensor) for tracking features of the user wearing the head-mountable device 100. For example, such sensors can perform facial feature detection, facial movement detection, facial recognition, eye tracking, user mood detection, user emotion detection, voice detection, etc. For example, an eye sensor can optically capture a view of an eye (e.g., pupil) and determine a direction of a gaze of the user. Such eye tracking may be used to determine a location and/or direction of interest. Detection and/or amplification of sound can then be focused if it is received from sources at such a location and/or along such a direction.

While some embodiments of touch-based input devices disclosed herein relate to head-mountable devices, it will be appreciated that the subject technology can encompass and be applied to other devices. For example, an input device (e.g., crown module) in accordance with embodiments disclosed herein can include a phone, a tablet computing device, a mobile computing device, a watch, a laptop computing device, a mouse, a game controller, a remote control, a digital media player, a stylus, and/or any other electronic device. Further, the external device can be any device that interacts with a touch-based input device. For example, an external device in accordance with embodiments disclosed herein can include a tablet, a phone, a laptop computing device, a desktop computing device, a wearable device, a mobile computing device, a tablet computing device, a display, a television, a phone, a digital media player, and/or any other electronic device.

Accordingly, embodiments of the present disclosure provide a head-mountable device with a crown module having an input system that allows a user to provide inputs by rotating or otherwise applying torque to a crown of the crown module. The head-mountable device can interpret the rotation and/or torque as a user input. The crown module can further include a feedback system that provides localized haptic feedback at the crown. The haptic feedback can be effectively perceived by the user at the crown without causing the entire head-mountable device to vibrate against the head and/or face of the user.

Various examples of aspects of the disclosure are described below as clauses for convenience. These are provided as examples, and do not limit the subject technology.

Clause A: a head-mountable device comprising: a housing; a crown positioned at least partially outside the housing; a shaft positioned within the housing and connected to the crown such that the shaft rotates with the crown and about an axis; a sensor for detecting rotation of the shaft; a magnetic element coupled to the shaft such that the magnetic element moves along the axis with the shaft; and a coil coupled to the housing and configured to induce a magnetic field in the magnetic element, such that, when the coil is activated, the magnetic element provides haptic feedback by moving the shaft and the crown relative to the housing.

Clause B: a head-mountable device comprising: a housing; a crown positioned at least partially outside the housing; a shaft positioned within the housing and connected to the crown such that a torque applied to the crown is transferred to the shaft; a sensor for detecting the torque transferred to the shaft; and a haptic feedback device coupled to the housing and configured to provide haptic feedback by moving the shaft and the crown relative to the housing.

Clause C: a crown module for a head-mountable device, the crown module comprising: a housing configured to be coupled to a frame of the head-mountable device; a crown positioned at least partially outside the housing; a shaft positioned within a sealed chamber of the housing and connected to the crown such that the shaft rotates with the crown and about an axis; a sensor for detecting rotation of the shaft and positioned within the sealed chamber; and a haptic feedback device positioned within the sealed chamber of the housing and configured to provide haptic feedback by moving the shaft and the crown along the axis and relative to the housing.

One or more of the above clauses can include one or more of the features described below. It is noted that any of the following clauses may be combined in any combination with each other, and placed into a respective independent clause, e.g., clause A, B, or C.

Clause 1: a frame; a display on an inner side of the frame; a camera on an outer side of the frame; a speaker; and a microphone.

Clause 2: the shaft is positioned within a sealed chamber of the housing that contains the sensor.

Clause 3: a pair of seal members each sealingly engaging an inner surface of the housing and an outer surface of the shaft, wherein the sensor is positioned axially between the pair of seal members.

Clause 4: the sensor is an optical sensor and the shaft comprises a visual feature for detection by the optical sensor.

Clause 5: the magnetic element and the coil are positioned within a sealed chamber of the housing.

Clause 6: the magnetic element is coupled to the shaft such that the magnetic element is configured to rotate independently of the shaft.

Clause 7: the coil is a first coil on a first axial side of the magnetic element; and the head-mountable device comprises a second coil on a second axial side of the magnetic element.

Clause 8: a controller configured to operate the coil in response to a detection by the sensor that the shaft is rotating.

Clause 9: the torque is about an axis and the haptic feedback comprises movement along the axis.

Clause 10: the sensor comprises multiple strain gauges.

Clause 11: the sensor comprises multiple strain gauges electrically connected to each other in a Wheatstone bridge arrangement.

Clause 12: at least two of the multiple strain gauges have different orientations relative to a longitudinal axis of the shaft.

Clause 13: the haptic feedback device comprises an actuator configured to expand toward and contract away from the shaft.

Clause 14: a controller configured to operate the haptic feedback device in response to a detection by the sensor that the torque is applied to the crown.

Clause 15: a pair of seal members each sealingly engaging an inner surface of the housing and an outer surface of the shaft, wherein the sensor is positioned axially between the pair of seal members.

Clause 16: the sensor is an optical sensor and the shaft comprises a visual feature for detection by the optical sensor.

Clause 17: the haptic feedback device comprises: a magnetic element coupled to the shaft such that the magnetic element moves along the axis with the shaft; and a coil coupled to the housing and configured to induce a magnetic field in the magnetic element, such that, when the coil is activated, the magnetic element provides haptic feedback by moving the shaft and the crown relative to the housing.

As described above, one aspect of the present technology may include the gathering and use of data available from various sources. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. A head-mountable device comprising:
a housing;
a crown positioned at least partially outside the housing;

a shaft positioned within the housing and connected to the crown such that the shaft rotates with the crown and about an axis;
a sensor for detecting rotation of the shaft;
a magnetic element coupled to the shaft such that the magnetic element moves along the axis with the shaft; and
a coil coupled to the housing and configured to induce a magnetic field in the magnetic element, such that, when the coil is activated, the magnetic element provides haptic feedback by moving the shaft and the crown relative to the housing, wherein at least one of the shaft, the sensor, the magnetic element, or the coil are within a sealed chamber of the housing.

2. The head-mountable device of claim 1, further comprising:
a frame;
a display on an inner side of the frame;
a camera on an outer side of the frame;
a speaker; and
a microphone.

3. The head-mountable device of claim 1, wherein the shaft is positioned within the sealed chamber of the housing that contains the sensor.

4. The head-mountable device of claim 3, further comprising a pair of seal members each sealingly engaging an inner surface of the housing and an outer surface of the shaft, wherein the sensor is positioned axially between the pair of seal members.

5. The head-mountable device of claim 4, wherein the sensor is an optical sensor and the shaft comprises a visual feature for detection by the optical sensor.

6. The head-mountable device of claim 1, wherein the magnetic element and the coil are positioned within the sealed chamber of the housing.

7. The head-mountable device of claim 1, wherein the magnetic element is coupled to the shaft such that the magnetic element is configured to rotate independently of the shaft.

8. The head-mountable device of claim 1, wherein:
the coil is a first coil on a first axial side of the magnetic element; and
the head-mountable device comprises a second coil on a second axial side of the magnetic element.

9. The head-mountable device of claim 1, further comprising a controller configured to operate the coil in response to a detection by the sensor that the shaft is rotating.

10. A head-mountable device comprising:
a housing;
a crown positioned at least partially outside the housing;
a shaft positioned within the housing and connected to the crown such that a torque applied to the crown is transferred to the shaft;
multiple strain gauges for detecting the torque transferred to the shaft; and
a haptic feedback device coupled to the housing and configured to provide haptic feedback by moving the shaft and the crown relative to the housing.

11. The head-mountable device of claim 10, wherein the torque is about an axis and the haptic feedback comprises movement along the axis.

12. The head-mountable device of claim 10, wherein the multiple strain gauges are electrically connected to each other in a Wheatstone bridge arrangement.

13. The head-mountable device of claim 12, wherein at least two of the multiple strain gauges have different orientations relative to a longitudinal axis of the shaft.

14. The head-mountable device of claim 10, wherein the haptic feedback device comprises an actuator configured to expand toward and contract away from the shaft.

15. The head-mountable device of claim 10, further comprising a controller configured to operate the haptic feedback device in response to a detection by the multiple strain gauges that the torque is applied to the crown.

16. A crown module for a head-mountable device, the crown module comprising:
a housing configured to be coupled to a frame of the head-mountable device;
a crown positioned at least partially outside the housing;
a shaft positioned within a sealed chamber of the housing and connected to the crown such that the shaft rotates with the crown and about an axis;
a sensor for detecting rotation of the shaft and positioned within the sealed chamber; and
a haptic feedback device positioned within the sealed chamber of the housing and configured to provide haptic feedback by moving the shaft and the crown along the axis and relative to the housing.

17. The crown module of claim 16, further comprising a pair of seal members each sealingly engaging an inner surface of the housing and an outer surface of the shaft, wherein the sensor is positioned axially between the pair of seal members.

18. The crown module of claim 16, wherein the sensor is an optical sensor and the shaft comprises a visual feature for detection by the optical sensor.

19. The crown module of claim 16, wherein the haptic feedback device comprises: a magnetic element coupled to the shaft such that the magnetic element moves along the axis with the shaft; and a coil coupled to the housing and configured to induce a magnetic field in the magnetic element, such that, when the coil is activated, the magnetic element provides haptic feedback by moving the shaft and the crown relative to the housing.

20. A method comprising:
receiving an input at a crown positioned at least partially outside a housing such that a shaft positioned within the housing and connected to the crown rotates with the crown and about an axis;
detecting rotation of the shaft with a sensor; and
providing haptic feedback by moving the shaft and the crown along the axis by inducing, with a coil coupled to the housing, a magnetic field in a magnetic element coupled to the shaft.

* * * * *